United States Patent
Shen et al.

(10) Patent No.: US 12,117,702 B2
(45) Date of Patent: Oct. 15, 2024

(54) BACKLIGHT UNIT FOR A VEHICLE COMPONENT

(71) Applicant: Continental Automotive Technologies GmbH, Hannover (DE)

(72) Inventors: Yew Chye Leonard Shen, Singapore (SG); Junn Yaw Ong, Singapore (SG); Yong How Dave Tan, Singapore (SG)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/018,638

(22) PCT Filed: Jul. 23, 2021

(86) PCT No.: PCT/EP2021/070664
§ 371 (c)(1),
(2) Date: Jan. 30, 2023

(87) PCT Pub. No.: WO2022/023197
PCT Pub. Date: Feb. 3, 2022

(65) Prior Publication Data
US 2024/0012303 A1    Jan. 11, 2024

(30) Foreign Application Priority Data
Jul. 31, 2020   (GB) ..................................... 2011940

(51) Int. Cl.
*G02F 1/1362* (2006.01)
*G02F 1/1335* (2006.01)
(Continued)

(52) U.S. Cl.
CPC .. *G02F 1/136209* (2013.01); *G02F 1/133514* (2013.01); *G02F 1/133615* (2013.01);
(Continued)

(58) Field of Classification Search
CPC . G02F 1/133615; G02F 1/1351; B60K 35/00; B60K 2370/1523; B60K 2370/343; B60K 2370/52
See application file for complete search history.

(56) References Cited

U.S. PATENT DOCUMENTS 7,869,129 B2    1/2011  Lebreton
2001/0004276 A1*  6/2001  Urabe ............... G02F 1/133555
                                                          349/122
(Continued)

FOREIGN PATENT DOCUMENTS

EP           3153916 A1    4/2017
KR      20150123915 A    11/2015
(Continued)

OTHER PUBLICATIONS

English Machine Translation of Muginraneza WO2017170131 (Year: 2023).*

(Continued)

*Primary Examiner* — Donald L Raleigh (57) ABSTRACT

A backlight unit for a vehicular component is disclosed. In particular, the vehicle component is for displaying vehicular information. The backlight unit comprises a screen divided into an array of segments and a transparent plate for directing light rays through the screen. Each segment of the array of segments is capable to operate between a mode for permitting light rays to pass through, allowing light rays passing through the transparent plate and the screen, and a mode for blocking light rays from passing through blocking light rays from passing through the screen.

13 Claims, 6 Drawing Sheets

(51) Int. Cl.
*G02F 1/13357* (2006.01)
*G02F 1/135* (2006.01)
*B60K 35/00* (2006.01)
*B60K 35/22* (2024.01)
*B60K 35/81* (2024.01)

(52) U.S. Cl.
CPC ............ *G02F 1/1351* (2021.01); *B60K 35/00* (2013.01); *B60K 35/22* (2024.01); *B60K 35/81* (2024.01); *B60K 2360/1523* (2024.01); *B60K 2360/343* (2024.01)

(56) References Cited

U.S. PATENT DOCUMENTS

| | | | |
|---|---|---|---|
| 2007/0171193 A1* | 7/2007 | Nakamura | B60K 35/00 345/156 |
| 2008/0062500 A1 | 3/2008 | Hagood, IV | |
| 2009/0267868 A1 | 10/2009 | Takatani et al. | |
| 2011/0148948 A1 | 6/2011 | Gandhi et al. | |
| 2014/0369072 A1 | 12/2014 | Liao et al. | |
| 2017/0096097 A1 | 4/2017 | Koch et al. | |
| 2019/0323674 A1* | 10/2019 | Chikama | F21S 43/255 |
| 2021/0405407 A1* | 12/2021 | Sun | G02F 1/133331 |

FOREIGN PATENT DOCUMENTS

| | | | |
|---|---|---|---|
| WO | 9633483 A1 | 10/1996 | |
| WO | 02069030 A2 | 9/2002 | |
| WO | WO-2017170131 A1 * | 10/2017 | G01L 1/14 |

OTHER PUBLICATIONS

Search Report dated Jan. 27, 2021 from corresponding GB patent application No. 2011940.0.

International Search Report and Written Opinion dated Aug. 25, 2021 from corresponding International Patent application No. PCT/EP2021/070664.

Baetens et al., Properties, requirements and possibilities of smart windows for dynamic daylight and solar energy control in buildings: A state-of-the-art review, (2010), Solar Energy Materials and Solar Cells, 94(2). 87-105, SINTEF.

Office Action submitted on Jul. 19, 2024 from corresponding Korean patent application No. 10-2023-7003689.

* cited by examiner

BACKLIGHT UNIT FOR A VEHICLE COMPONENT

CROSS REFERENCE TO RELATED APPLICATIONS

This U.S. patent application claims the benefit of PCT patent application no. PCT/EP2021/070664, filed Jul. 23, 2021, which claims the benefit of UK patent application no. GB 2011940.0, filed Jul. 31, 2020, both of which are hereby incorporated by reference.

TECHNICAL FIELD

This disclosure relates to a backlight unit. For example, a backlight unit for a vehicle component for displaying vehicular information.

BACKGROUND

Motor vehicle commonly uses instrument clusters for displaying vehicle operating parameters such as vehicle speed, distance travelled, fuel gauge, engine rpm and direction indicators to driver.

As motor vehicles evolved, an increasing amount of information is being conveyed to a driver. Some examples include navigation maps, warning systems and tire pressure monitoring information which may be integrated and analysed by control units within the vehicle. Consequently, there is a need for improved usage of space constrains and instrument clusters are being replaced by display apparatus, head-up displays or even secondary displays available as aftermarket product or workshop modifications, for example additional display apparatus for mounting on the motor vehicle panel, so that more information may be conveyed to the driver.

One of the main challenges of using a display within a motor vehicle for conveying vehicular information is visibility of information, due to technology limitation and/or external factors such as sunlight or natural light from outside the vehicle that emits through windshield to the panel of a motor vehicle. The term "visibility" used in the context of information display refers to the degree in the information showing on the display has general prominence, to be clearly seen or read by a viewer.

In the field of optical transmission, the use of light guides is a common solution for directing light rays towards a specific area, for example a display area to increase illumination. In a display apparatus, a backlight unit replaces the light guide, to illuminate a display panel, improve contrast and resolution, such that a visual output, for example graphical content or vehicular information displayed may be effortlessly seen by a viewer.

Due to current technology limitation, some light rays from the backlight unit of the display apparatus may still leak through the display, thus creating a halo around darken areas of the screen. This is an undesirable effect, as not only does it affects aesthetic of visual output displayed. The halo effect may also deteriorate visibility of information displayed, which may even lead to safety issues for a driver. There is therefore, a need for a backlight unit which achieves the purpose of local dimming effectively to yield a high contrast, high resolution digital vehicular information display apparatus.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A purpose of this disclosure is to ameliorate the problem of undesirable halo effect in a digital display apparatus caused by light rays transmitting from one region to another region due to light flux, by providing the subject-matter of the independent claims.

The purpose as described above is achieved by a backlight unit for use in a vehicle component. The backlight unit may comprise a screen divided into an array of segments and a transparent plate for directing light rays through the screen. Each segment of the array of segments may be configured to switch between a pass mode for permitting light rays directed from the transparent plate to pass through the segment and a block mode for blocking light rays directed from the transparent plate from passing through the segment. The term "transparent" may refer to a see-through effect or a clear material. In the context used herein, "a transparent plate" refers to a plate that is made of see-through material, such that an object behind or underneath may be seen and at the same time, allows light rays to pass through. An example of a transparent material is resin. The configuration of a backlight unit comprising a screen divided into array of segments and integrating the screen with a transparent plate for directing light rays prevents light flux propagating to neighbouring segments when light rays from the backlight unit is illuminated through a display panel. Consequently, a display apparatus with high contrast, high resolution output.

In one embodiment, the screen may be configured to switch at least a first region of the array of segments to the mode for permitting light rays to pass through the transparent plate to the screen and simultaneously switch at least a second region of the array of segments to the mode for blocking light rays from passing through the transparent plate to the screen. The feature of switching each segment between a pass mode and a block mode enables controlling mode of operation at one or more segments, thus eliminating halo effect.

In one embodiment, each segment may be configured to allow light rays directed from the transparent plate to propagate through the segment by at least 45% of light rays having a wavelength between 380 nm to 780 nm when switched to the pass mode. In one embodiment, each segment may be configured to block light rays directed from the transparent plate to propagate through the segment, wherein preferably at least 95% of light rays coming from the transparent plate and having a wavelength between 380 nm to 780 nm are blocked. The benefit of a low intensity of light rays passing through each segment eliminates light flux and increases local dimming effect.

In one embodiment, the backlight unit further comprises supplying an electrical field for switching one or more segments between the pass mode and the block mode, wherein supplying an electrical field may be configured to switch more than one segment, independently from one another, from pass mode to block mode or vice versa.

In one embodiment, when switched to the block mode, the segment may be substantially or totally black. The substantially black segment may be a segment which blocks out the light rays by at least 98%, more preferably, 99%, even more preferably 99.9%. A substantially black or totally black segment eliminates undesirable halo effect framing a visual output, therefore achieving local dimming.

In one embodiment, the light source may be displaced along at least a lateral end of the transparent plate. The benefit of this configuration yields a thinner backlight unit.

In one embodiment, the screen may comprises a display panel. The display panel may be a type of liquid crystal display panel comprising a thin-film transistor display panel, or a twisted nematic display panel. In one embodiment, the screen may consist of switchable glass. The aforesaid configurations may be easily integrated with conventional backlight units without designing and fabricating a screen, yet at the same time, achieve the purpose of a backlight unit which yields a high contrast, high resolution digital vehicular information display apparatus.

In one embodiment, the display panel may include a colour filter. Each cell of the colour filter may be at least partially aligned with each segment of the screen. This configuration improves the contrast of images displayed to achieve high resolution visual perspective.

The purpose as described above is achieved by a vehicle component for mounting onto a panel of a motor vehicle. The vehicle component may comprise a display panel and a backlight unit as disclosed herein. Suitable types of vehicle components may be a digital dashboard, or a display for displaying vehicular information. The use of a display panel with the backlight unit configuration disclosed herein achieves a high contrast, high resolution display apparatus for use in a motor vehicle. Since the backlight unit eliminates light flux and halo effect, local dimming is achieved.

The purpose as described above is achieved by a vehicle component operable to stow away under or eject from a panel of a motor vehicle is disclosed. The vehicle component may comprise a display panel and a backlight unit as disclosed herein. The benefit of using the backlight unit configuration disclosed herein with a display panel achieves a high contrast, high resolution display apparatus with local dimming effect, for use in a motor vehicle. Since the backlight unit eliminates light flux and halo effect, local dimming is achieved.

Other aspects and advantages of this disclosure will be described in detail below.

BRIEF DESCRIPTION OF THE DRAWINGS

The present disclosure will become more fully understood from the following detailed description and the accompanying drawings, wherein.

In various embodiments described by reference to the above figures, like reference signs refer to like components in several views and/or configurations.

DETAILED DESCRIPTION

Embodiments described below are used to facilitate understanding of the present disclosure, and those skilled in the art will comprehend that the present disclosure is not unduly limited by the embodiments described below.

Hereinafter, the term "transparent" refers to a see-through or clear material, such that object behind or underneath may be seen and/or a characteristic of the object, for allowing light rays to pass through. For example, when referred to an object or article such as "a transparent plate", it means the plate is made of clear, see-through material, thereby allowing light rays to pass through. An example of a transparent material is resin.

The terms such as "above", "below", "underneath", "behind", etc., are used descriptively for the figures, and do not represent limitations on the scope of the disclosure, as defined by the appended claims.

The term "first", "second", "third" and the like used in the context of this disclosure may refer to modification of different elements in accordance to various exemplary embodiments, but not limited thereto. The expressions may be used to distinguish one element from another element, regardless of sequence of importance.

The term "align", and its grammatical variation thereof shall be construed to refer to placement of elements in a relative relationship to each other. In the context used herein, the term "alignment" of two or more elements refers to arrangement of Element A in a relatively straight line with Element B.

The term "substantially" used in the context of colour shall preferably refer to a colour tone falling below 0.1% to of light in a range of a wavelength between 380 nm to 780 nm is blocked, i.e. absence of visible light.

Figure 1A:
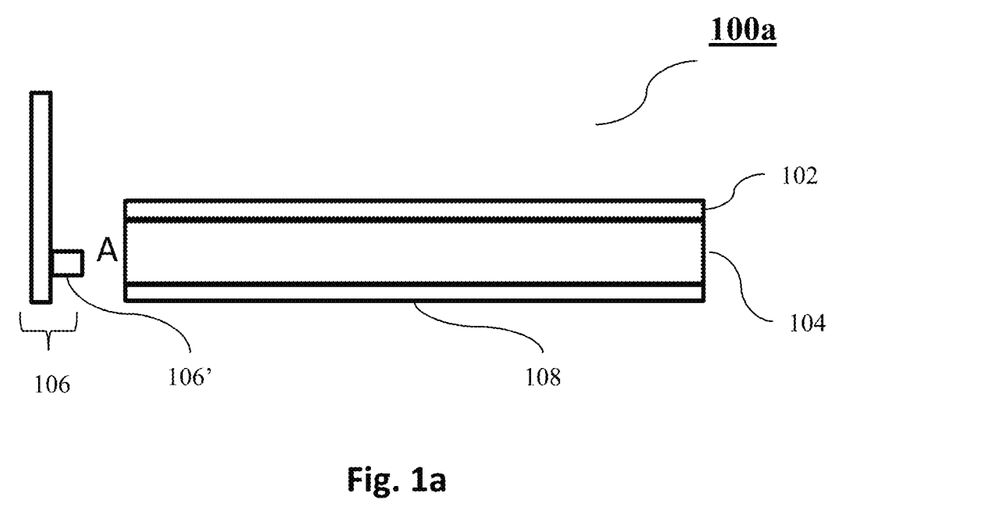
FIG. 1a shows a cross-sectional view of a backlight unit according to an embodiment.
Figure 1B:
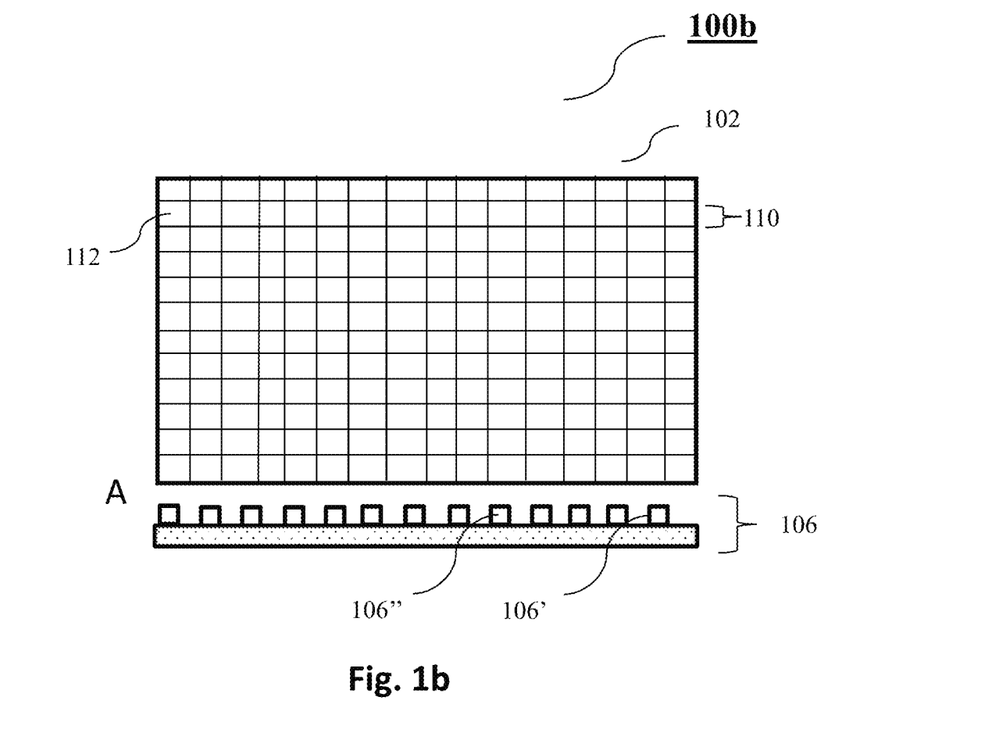
FIG. 1b shows a top view of a backlight unit according to an embodiment.

Referring to the accompanying drawings, FIG. 1a shows a side view of a backlight unit 100a, which includes a screen 102, a transparent plate 104 and a backplate or housing 108. A light source 106 is arranged at a lateral end (A) of the transparent plate 104. The light source 106 may be a strip or an array of light emitting diode (LED) 106', 106" as shown in FIG. 1b. The light source 106 may be arranged along at least one lateral end of the transparent plate 104. In certain embodiments, it may be around a perimeter of the transparent plate 104.

With reference to FIG. 1b which shows a top view of the backlight unit 100b according to an embodiment, the screen 102 is divided into a plurality of array of segments. As shown here, an array of segment 110 includes two or more segments, each segment 112 arranged side by side with another segment 112 in a row and/or column. Seen from the top view, the light source 106 has a plurality of LEDs 106', 106", arranged along at last a lateral end (A) of the screen 102.

Each segment 112 operates between a mode for permitting light rays to pass through (i.e. a pass mode) and a mode for blocking light rays from passing through (i.e. an block mode), of which the switching between the pass mode and the block mode shall be operated by supplying an electrical field. The switching of modes between the pass mode and the block mode shall be simultaneous. Examples of suitable supplying an electrical field may be an electrical circuitry such as a printed circuit board (PCB), or a computer program executable by a processor. The supplying the electrical field to the one or more segments (110) between the pass mode and the block mode, wherein the supplying an electrical field is configured to switch more than one segment (110), independently from one another, from pass mode to block mode or vice versa. Examples of suitable types of screens which are operable between a pass mode and an block mode may be a switchable glass (also known as smart glass) or a type of liquid crystal display which allows matrix control, such as a thin-film transistor (TFT) display panel or a twist-nematic (TN) display panel. For clarity and brevity, examples of switchable glass include glass made of or has been treated with an active component for switching between a mode to allow light rays to pass through, and a mode to block light rays from passing through when an electrical field is applied. In certain embodiment, the glass is adhered with an adhesive film having the active component. The active component includes electrochromic material, photochromic material, thermochromic material, suspended-particle, micro-blind, or polymer-dispersed liquid-crystal (PDLC). Other materials suitable for switching a glass between permitting light rays to pass through and blocking light rays from passing through may be found in Baetens, R.; Jelle, B. P.; Gustaysen, A. (2010). "Properties, requirements and possibilities of smart windows for dynamic daylight and solar energy control in buildings: A state-of-the-art review". *Solar Energy Materials and Solar Cells*.

When operating in the pass mode, light rays emitting from the light source 106 is directed from the transparent plate 104 and propagates through each segment 112 of the screen 102. The intensity of light rays permitted to propagate through the screen 102 shall be at least 45% of light rays directed through transparent plate 104. Shown in FIG. 1c of the accompanying drawings, a first region or a cluster of segments 112' that are arranged side by side, are operating in the same mode, represented as lit-up when light rays are permitted to pass through at least one of the segments 112.

Figure 1C:
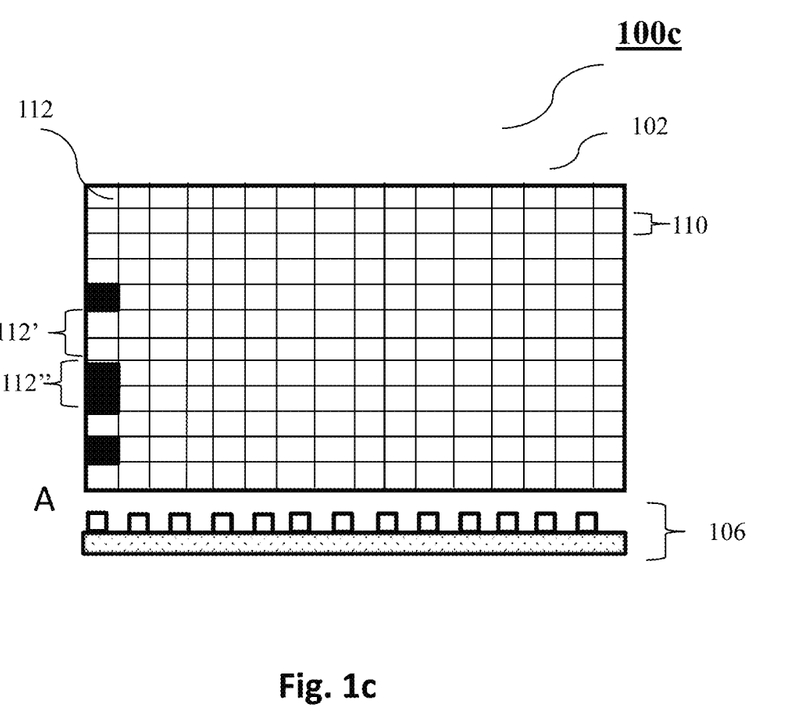
FIG. 1c shows a top view of a backlight unit according to an embodiment when in operation.

When operating in the block mode, light rays emitting from the light source 106 is transmitted through the transparent plate 104. However, each segment 112 that is operating in the block mode blocks the light rays from propagating each segment 112 of the screen 102. Referring to FIG. 1c, these segments 112 operating in the block mode are shown as a second region or a cluster of segments 112", i.e. two or more of segments arranged side by side are operating in the same mode, which appears substantially black or near black visual output. One of the advantages of the configuration of the backlight unit disclosed herein is the ability to configure each segment 112 of the screen 102 to switch between a mode to permit light rays to pass through the segment and a mode to block light rays to pass through each segment or cluster of segments, thereby localising illumination at very specific location or predetermined region, reducing light flux due to light rays propagating from neighbouring cell, thus reducing halo effect and achieving local dimming. The above disclosure provides an embodiment of the array of segments 110 may operate individually (i.e. each segment) or regionally (i.e. cluster of segments). The supplying an electrical field for switching one or more segments between the past mode and the block mode is configured to switch more than one segment in either the pass mode or the block mode, to create a region or cluster of segments operating as segment 112' or segment 112" respectively. The supplying the electrical field is further configured to switch each segment 112 of the array of segments independently from one another, from the pass mode to the block mode or vice versa. Although the example given only shows two segments in a single row (2 segments in a row of an array of segments) operating in the pass mode and the block mode, it shall be understood by the person skilled in the art, the clustering of array of segments 110 to permit light rays to pass through the segment 112 or to block light rays from passing through the segment 112 is non-limiting and may be clustered in any combination, for example 2 segments in 2 rows or columns, 6 segments in 6 rows or columns, so on and so forth, depending on design specification, without departing from the scope of this disclosure.

Figure 2:
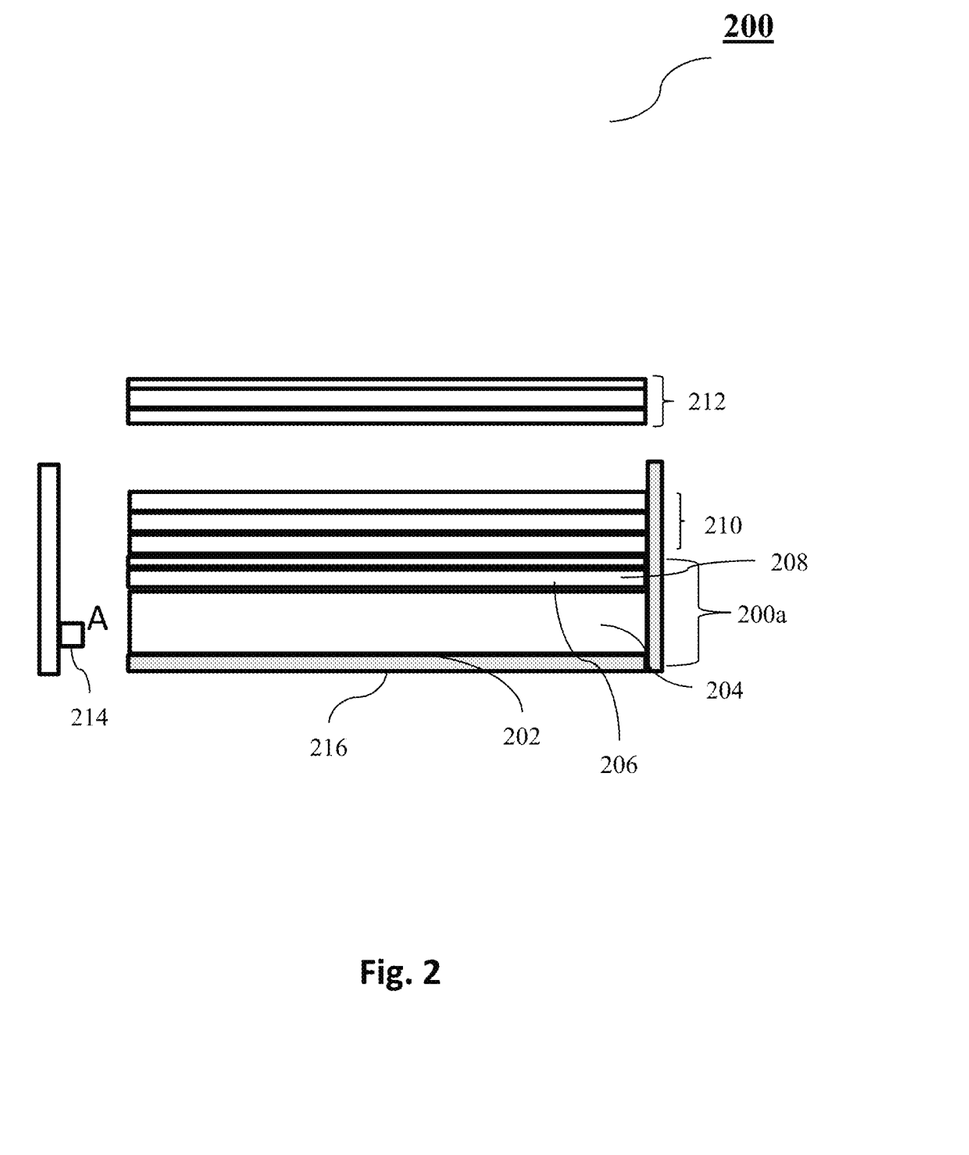
FIG. 2 shows a side view of a digital display apparatus comprising a backlight unit according to an embodiment.

Turning now to FIG. 2 of the accompanying drawings, a cross-section view of the backlight unit 200a in an embodiment is shown. A vehicle component 200 comprising a display panel 212 and a backlight unit 200a according to this embodiment. The backlight unit 200a includes a transparent plate 204, a screen 206, a light source 214 positioned at a lateral end (A) of the transparent plate 204 and housing 216. Example of a vehicle component which utilises display pane and backlight unit may be a digital instrument cluster or a display apparatus for displaying vehicular information. The vehicle component 200 may include other optical elements for directing light rays towards displaying areas to increase illumination and improve visibility of visual output displayed, where such components may include a reflector 202, a diffusing layer 208, an optical foil layer 210, etc. Nonetheless, it shall be understood by a person skilled in the art, modification to type and/or position of the aforesaid optical elements in the design of the vehicle component 200 shall not depart from the scope of this disclosure.

Figure 3:
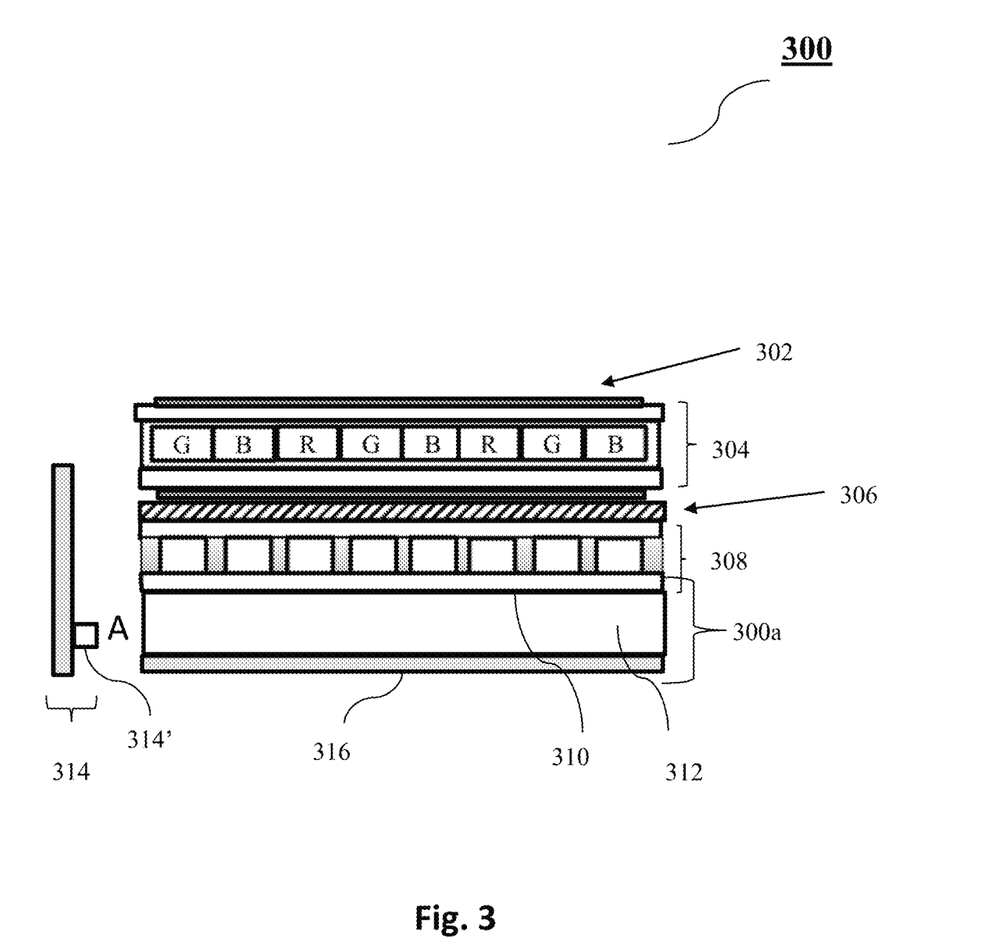
FIG. 3 shows a side view of a digital display apparatus comprising a backlight unit according to a second embodiment.

In another embodiment as shown in FIG. 3, a backlight unit 300a according to this disclosure is shown. According to this embodiment, the screen is display panel 308. An example of a display panel is a type of liquid crystal display panel, such as a thin-film transistor (TFT) display panel or a twisted nematic (TN) display panel. Each segment of the LCD display panel 308 is aligned with an image cell of a colour filter 304. A light source 314 is positioned at a lateral end (A) of the transparent plate 312. A backplate or housing 216 houses the components. In this embodiment, a colour filter 304 is used together with the backlight unit 300a to achieve high resolution visual output. Shown here in FIG. 3 is a red, blue, green (RDB) colour filter. Nonetheless, it shall be comprehended by a person skilled in the art modification to the type of colour filters is non-limiting and does not depart from the scope of this disclosure. The image cell of the colour filter 304 may be aligned and bonded to each segment of the LCD display panel 308 to yield an integrated backlight unit. Optional optical element such as top and rear polarisers 302, 210 may be necessary to increase illumination.

Referring again to FIG. 1c and with reference to the description above, when operating in the pass mode, the cluster of segments 112' permit light rays to transmit through the transparent plate 104 and propagate through each segment 112 of the screen 102. Since light rays are permitted to propagate through the cluster of segments 112', visual output may be viewed by a user on the segments 112' operating in the pass mode, which in turn defines a first region, for example a displaying region for displaying a visual output on a display apparatus. The cluster of segments 112" operating in the block mode as shown in FIG. 1c defines a second region or non-displaying region when light rays are illuminated from the backlight unit 100a, 100b, 110c through a display panel, such as display panel 212 shown on embodiment as illustrated on FIG. 2.

Figure 4A:
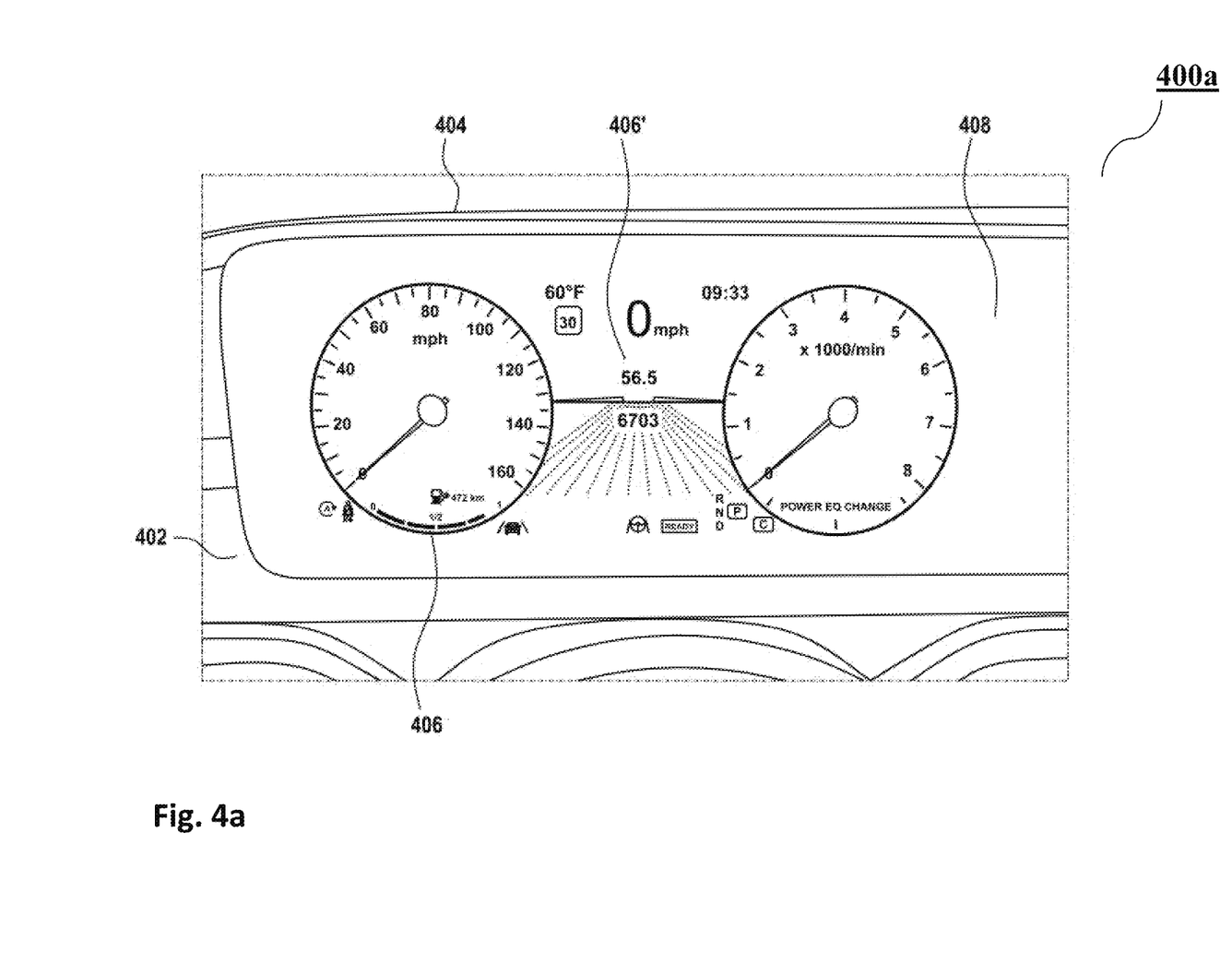
FIG. 4a shows a digital vehicular information display apparatus comprising a backlight unit according to an embodiment.

By way of an embodiment as illustrated in FIG. 4a, a vehicle component 400a is shown. A digital display apparatus for displaying vehicular information 404 is mounted on a panel 402 of a motor vehicle. An example of such vehicle component 400a is a digital dashboard. The visual output corresponding to a position of the segments 112' of the screen 102 operating in the pass mode is represented by a cluster of segments 112' (FIG. 1c referred), defining the display region 406, 406'. The segment operating in the block mode correspond to a position of at least one cluster of segments 112", which is a substantially black or totally black visual output, defining a second region or a non-displaying region 408. The displaying region 406, 406' may be simultaneously switched to the respective modes, namely the block mode and the pass mode.

Figure 4B:
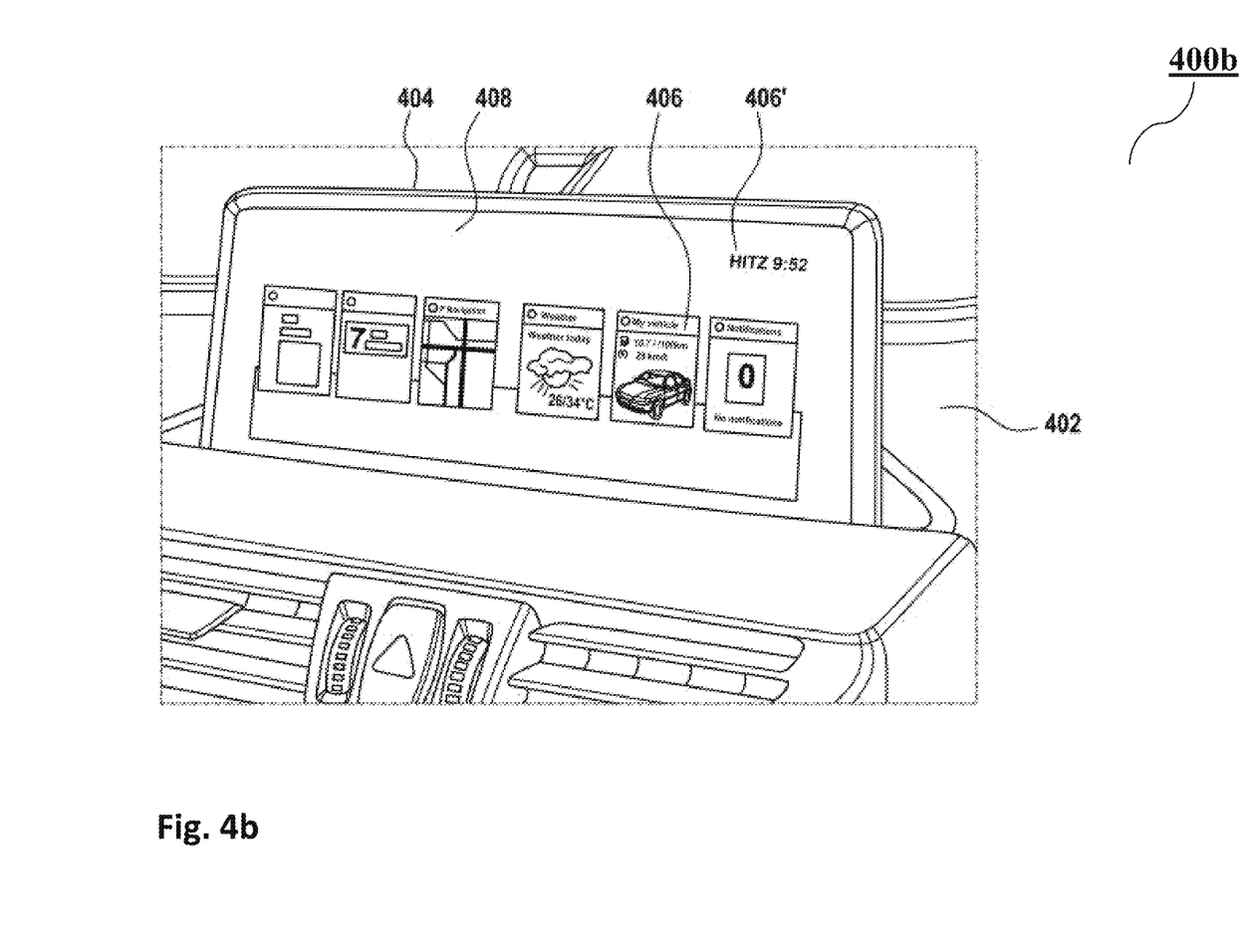
FIG. 4b show a digital vehicular information display apparatus comprising a backlight unit according to a second embodiment.

In another embodiment illustrated in FIG. 4b, another type of vehicle component 400b. An example of such a digital display apparatus 404 is also for use in a motor vehicle for displaying vehicular information but may be stowaway or ejected above a panel 402 of the motor vehicle. The visual output defines a first region or a displaying region 406. 406' which corresponds to a cluster of segments 112' of the screen 102 shown in FIG. 1c, operating in the pass mode. On a similar note, a second region or a non-displaying region 408 operating in the block mode. The non-displaying region 408 corresponds to the position of cluster of segments 112" of the array of segment shown in FIG. 1c, that blocks light rays from passing through at least one of the segments 112.

As illustrated in above embodiments, the screen 102, 206, 308 is operable to switch to the pass mode in a first region to produce a visual output on a display panel, and simultaneously switch to the block mode in a second region to produce a substantially black or total black segments, by supplying an electrical field to the screen 102, 206, 308. To yield a high contrast, high resolution visual output on a display panel, each segment 112 of the screen 102, 206, 308 is operable to switch to the block mode to block light rays directed from the transparent plate 104, 204, 312 to propagate through the segment 112. Preferably, at least 95% of light rays coming from the transparent plate and having a wavelength between 380 nm to 780 nm are blocked, thus achieving local diming. The objective is to permit 0% of light rays pass to through (i.e. 100% of light rays to be blocked) each segment 112, to achieve a substantially black or totally black non-displaying region, i.e. absence of light rays. Preferably, the percentage of light rays blocked from passing through each segment 112 or directed from the transparent plate 104, 204, 312 shall be at least 98%, more preferably 99% and even more preferably, 99.9%, of which the light rays falls within a range of wavelength between 380 nm to 780 nm, to achieve a substantially black or totally black segment 112" or non-displaying region 408.

The detailed description above serves the purpose of explaining the principles of the present disclosure and its practical application, thereby enabling others skilled in the art to understand the disclosure for various exemplary embodiments and with various modifications as are suited to the particular use contemplated. The detailed description is not intended to be exhaustive or to limit the present disclosure to the precise embodiments herein. Modifications and equivalents will be apparent to practitioners skilled in this art and are encompassed within the scope and spirit of the appended claims.

The invention claimed is:

1. A backlight unit for use in a vehicle component comprising:
   a screen divided into an array of segments; and
   a transparent plate for directing light rays through the screen, wherein each segment of the array of segments is configured to simultaneously switch between a pass mode for permitting light rays directed from the transparent plate to pass through the segment and a block mode for blocking light rays from the transparent plate from passing through the segment, wherein at least 45% of light rays directed from the transparent plate are allowed to propagate through the segment when switched to the pass mode, and wherein at least 95% of light rays coming from the transparent plate and having a wavelength between 380 nm to 780 nm are blocked when switched the block mode, to thereby prevent light flux propagating to neighbouring segments when light rays from the backlight unit is illuminated.

2. The backlight unit of claim 1, wherein the screen is configured to switch at least a first region of the array of segments to the mode for permitting light rays to pass through the transparent plate to the screen and simultaneously switch at least a second region of the array of segments to the mode for blocking light rays from passing through the transparent plate to the screen.

3. The backlight unit of claim 1, further comprising supplying an electrical field for switching one or more segments between the pass mode and the block mode, wherein preferably the supplying an electrical field is configured to switch more than one segment, independently from one another, from pass mode to block mode or vice versa.

4. The backlight unit of claim 1, wherein, when a segment is switched to the block mode, the segment is substantially or totally black.

5. The backlight unit of claim 4, wherein the substantially black segment is a segment which blocks out the light rays coming from the transparent plate by at least 98%, preferably at least 99%, more preferably at least 99.9%.

6. The backlight unit according to claim 1, wherein a light source is displaced along at least a lateral end of the transparent plate.

7. The backlight unit according to claim 1, wherein the screen comprises a display panel.

8. The backlight unit according to claim 7, wherein the display panel is a type of liquid crystal display (LCD) panel.

9. The backlight unit according to claim 8, wherein the type of liquid crystal display panel comprises a thin-film transistor (TFT) display panel or a twisted nematic (TN) display panel.

10. The backlight unit according to claim 1, wherein the screen consists of switchable glass.

11. The backlight unit according to claim 7, wherein the display panel further comprises a colour filter, wherein each cell (R,G,B) of the colour filter is at least partially aligned with each segment of the screen.

12. A vehicle component for mounting onto a panel of a motor vehicle comprising:
   a display panel; and
   a backlight unit comprising:
      a screen divided into an array of segments; and
      a transparent plate for directing light rays through the screen, wherein each segment of the array of segments is configured to simultaneously switch between a pass mode for permitting light rays directed from the transparent plate to pass through the segment and a block mode for blocking light rays from the transparent plate from passing through the segment, wherein each segment is configured to allow light rays directed from the transparent plate to propagate through the segment, wherein at least 45% of light rays coming from the transparent plate propagate through the segment switched to the pass mode, and wherein each segment is configured to block light rays directed from the transparent plate to propagate through the segment, wherein at least 95% of light rays coming from the transparent plate and having a wavelength between 380 nm to 780 nm are blocked, to thereby prevent light flux propagating to neighbouring segments when light rays from the backlight unit is illuminated.

13. A vehicle component operable to stow away under or eject from a panel of a motor vehicle comprising:
    a display panel; and
    a backlight unit comprising:
        a screen divided into an array of segments; and
        a transparent plate for directing light rays through the screen, wherein each segment of the array of segments is configured to simultaneously switch between a pass mode for permitting light rays directed from the transparent plate to pass through the segment and a block mode for blocking light rays from the transparent plate from passing through the segment, wherein at least 45% of light rays directed from the transparent plate are allowed to propagate through the segment when switched to the pass mode, and wherein at least 95% of light rays coming from the transparent plate and having a wavelength between 380 nm to 780 nm are blocked when switched to the block mode, to thereby prevent light flux propagating to neighbouring segments when light rays from the backlight unit is illuminated.

* * * * *